(12) United States Patent
Nakamura

(10) Patent No.: US 10,229,594 B2
(45) Date of Patent: Mar. 12, 2019

(54) VEHICLE WARNING DEVICE

(71) Applicant: NIPPON SEIKI CO., LTD., Niigata (JP)

(72) Inventor: Takashi Nakamura, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 15/126,451

(22) PCT Filed: Mar. 13, 2015

(86) PCT No.: PCT/JP2015/057418
§ 371 (c)(1),
(2) Date: Sep. 15, 2016

(87) PCT Pub. No.: WO2015/146619
PCT Pub. Date: Oct. 1, 2015

(65) Prior Publication Data
US 2017/0084176 A1 Mar. 23, 2017

(30) Foreign Application Priority Data

Mar. 27, 2014 (JP) ................................ 2014-065112

(51) Int. Cl.
*G08G 1/16* (2006.01)
*B60K 35/00* (2006.01)
(Continued)

(52) U.S. Cl.
CPC ............. *G08G 1/16* (2013.01); *B60K 35/00* (2013.01); *B60R 1/00* (2013.01); *G02B 27/01* (2013.01);
(Continued)

(58) Field of Classification Search
CPC .... B60R 1/00; B60R 1/12; B60R 1/04; G06K 9/00798
See application file for complete search history.

(56) References Cited

U.S. PATENT DOCUMENTS

2007/0106475 A1* 5/2007 Kondoh ............... B60K 26/021
701/301
2009/0073081 A1 3/2009 Kakizaki
(Continued)

FOREIGN PATENT DOCUMENTS

JP 08-094756 A 4/1996
JP 2006-174288 A 6/2006
(Continued)

OTHER PUBLICATIONS

Search Report issued in corresponding International Application No. PCT/JP2015/057418, dated Jun. 16, 2015.

*Primary Examiner* — Nan-Ying Yang
(74) *Attorney, Agent, or Firm* — McDermott Will & Emery LLP

(57) ABSTRACT

The present invention suppresses movement of the line of sight of a user, reports the degree of potential risk, and contributes to the safe operation of a vehicle. A vicinity-monitoring unit detects a specific object in the vicinity of the vehicle. A display unit displays a mark image, which is visible to the user and is disposed continuously or intermittently on a trajectory, in a manner so as to surround the specific object at least partially. A control unit calculates the risk potential in relation to the specific object and alters, in accordance with the calculated risk potential, the line density of the mark image disposed on the trajectory.

12 Claims, 5 Drawing Sheets

(51) Int. Cl.
    *B60Q 9/00* (2006.01)
    *G09G 5/00* (2006.01)
    *H04N 13/204* (2018.01)
    *G02B 27/01* (2006.01)
    *G06K 9/00* (2006.01)
    *B60R 1/00* (2006.01)
    *G06T 7/70* (2017.01)

(52) U.S. Cl.
    CPC ..... *G02B 27/0101* (2013.01); *G06K 9/00798* (2013.01); *G06K 9/00805* (2013.01); *G06T 7/70* (2017.01); *H04N 13/204* (2018.05); *B60R 2300/103* (2013.01); *B60R 2300/107* (2013.01); *B60R 2300/205* (2013.01); *B60R 2300/301* (2013.01); *B60R 2300/308* (2013.01); *G02B 2027/014* (2013.01); *G02B 2027/0138* (2013.01); *G02B 2027/0141* (2013.01)

(56) References Cited

U.S. PATENT DOCUMENTS

2016/0082840 A1* 3/2016 Yoshida ................ B60K 35/00 701/36
2016/0152184 A1* 6/2016 Ogawa ............... G02B 27/0101 345/589
2016/0159280 A1* 6/2016 Takazawa ............. B60K 35/00 345/8

FOREIGN PATENT DOCUMENTS

| | | |
|---|---|---|
| JP | 2007-048041 A | 2/2007 |
| JP | 2007-153307 A | 6/2007 |
| JP | 2009-067368 A | 4/2009 |
| WO | 2011/117974 A1 | 9/2011 |

\* cited by examiner

FIG. 2
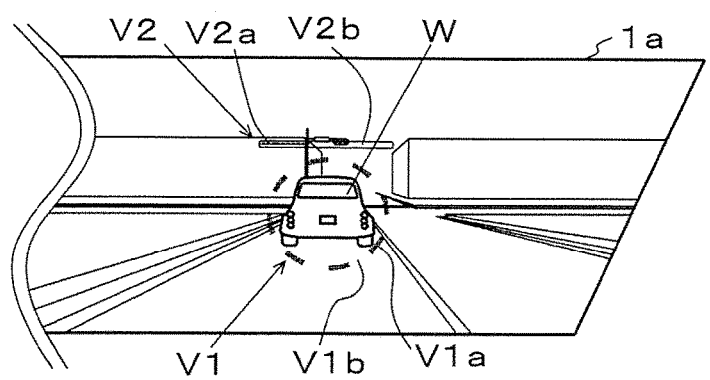
(a)
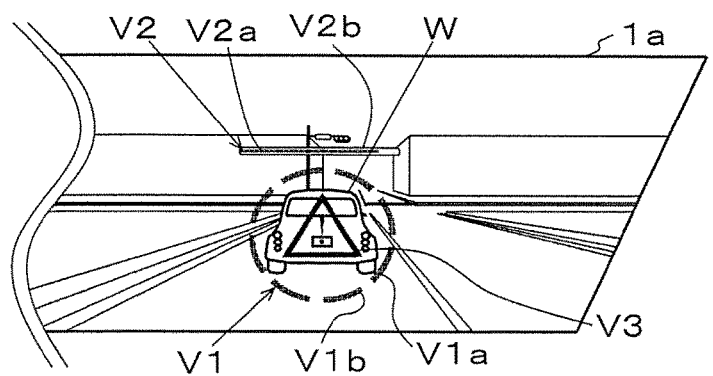
(b)

FIG. 5
(a) Low risk potential
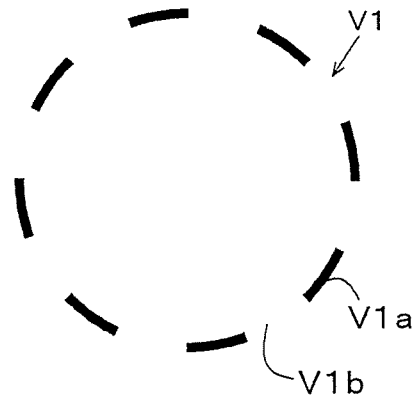
(b) High risk potential
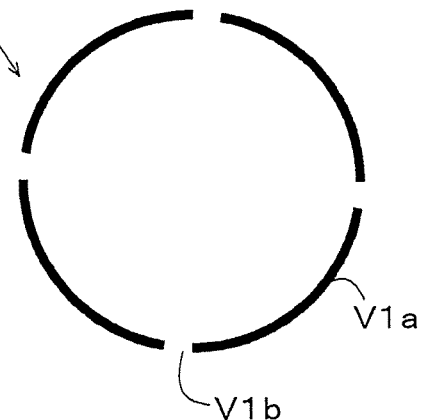
(c) Low risk potential
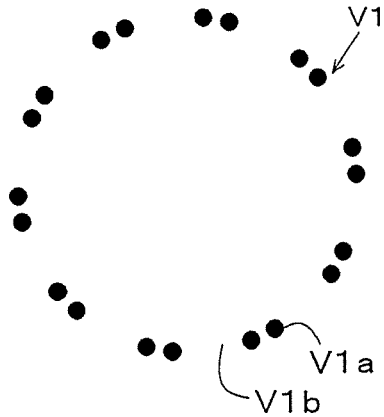
(d) High risk potential
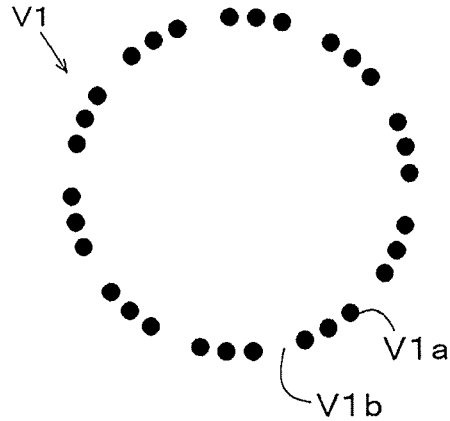
(e) Low risk potential
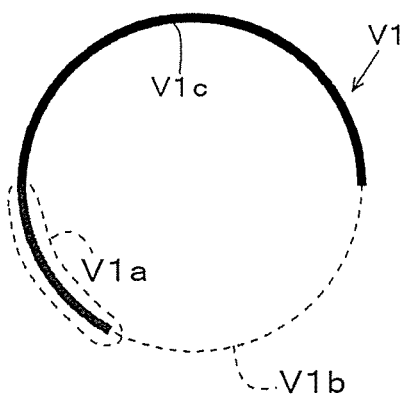
(f) High risk potential
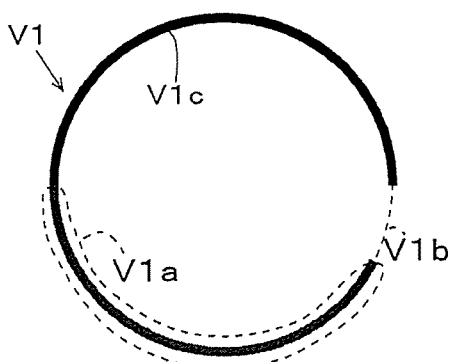

VEHICLE WARNING DEVICE

CROSS REFERENCE

This application is the U.S. National Phase under 35 U.S.C. § 371 of International Application No. PCT/JP2015/057418, filed on Mar. 13, 2015, which claims the benefit of Japanese Application No. 2014-065112, filed on Mar. 27, 2014, the entire contents of each are hereby incorporated by reference.

TECHNICAL FIELD

The present invention relates to a vehicle warning device, which calls attention by displaying warning information to a vehicle occupant.

BACKGROUND ART

As a conventional vehicle warning device, there has been known a device, which issues a warning using a headup display unit as disclosed in Patent Literature 1. The vehicle warning device disclosed in Patent Literature 1 detects a distance between an own vehicle and a preceding vehicle located ahead of the own vehicle, superimposes a mark image on a preceding vehicle in a visual field of a vehicle driver (user) by a headup display unit, and displays an index image numerically showing a distance between the own vehicle and the preceding vehicle in other area than the mark image by a headup display unit. Therefore, it is possible to inform a user of a position of an object (preceding vehicle) to be paid attention by displaying a mark image, and to inform a user of a dangerous index (vehicle distance) by displaying a dangerous index image.

However, as the mark image and the dangerous index image denoting a vehicle distance and the like are displayed at positions distant from each other, a user always has to move eyes to recognize the position of the object to be paid attention and the dangerous index. This might distract the attention of the user.

Further, Patent Literature 2 discloses a vehicle driving assist device, which calculates a risk potential such as a distance between an own vehicle and a preceding vehicle, and changes the size, color, brightness and the like of a mark image to be superimposed on a preceding vehicle in accordance with the risk potential.

CITATION LIST

Patent Literature

Patent Literature 1: JP-A-H8-94756
Patent Literature 2: JP-A-2007-153307

SUMMARY OF THE INVENTION

Problems to be Solved by the Invention

However, as in Patent Document 2, even when changing the size, display color, brightness and the like of the mark image in accordance with the risk potential, it is difficult to recognize how much of the risk the size, display color, and brightness of the mark image indicate. Thus, there has been room for improvement to promote an appropriate driving operation for the warning.

An object of the present invention is to suppress a movement of a line of sight of a user, and to notify the degree of potential risk in a vehicle warning device, for contributing to safe vehicle operation.

Solution to Problem

In order to achieve the above described object, a vehicle warning device according to a present invention includes a periphery monitoring unit that detects a specific object in proximity to a vehicle, a display unit that displays a mark image, which is visible to a user and is disposed continuously or intermittently on a trajectory so as to surround at least a part of the specific object, and a control unit that controls the display unit, in which the control unit calculates a risk potential relative to the specific object, and alters a line density of the mark image disposed on the trajectory in accordance with the calculated risk potential.

Effect of the Invention

According to the present invention, it is possible to suppress a movement of a line of sight of a user, and to notify the degree of potential risk, for contributing to safe vehicle operation.

BRIEF DESCRIPTION OF THE DRAWINGS

FIG. 2 shows scenes recognized by a vehicle occupant in the above embodiment, wherein (a) shows a scene with low risk potential, and (b) shows a scene with high risk potential.

FIG. 5 shows modifications of a mark image in the above embodiment.

MODE FOR CARRYING OUT THE INVENTION

Figure 1:
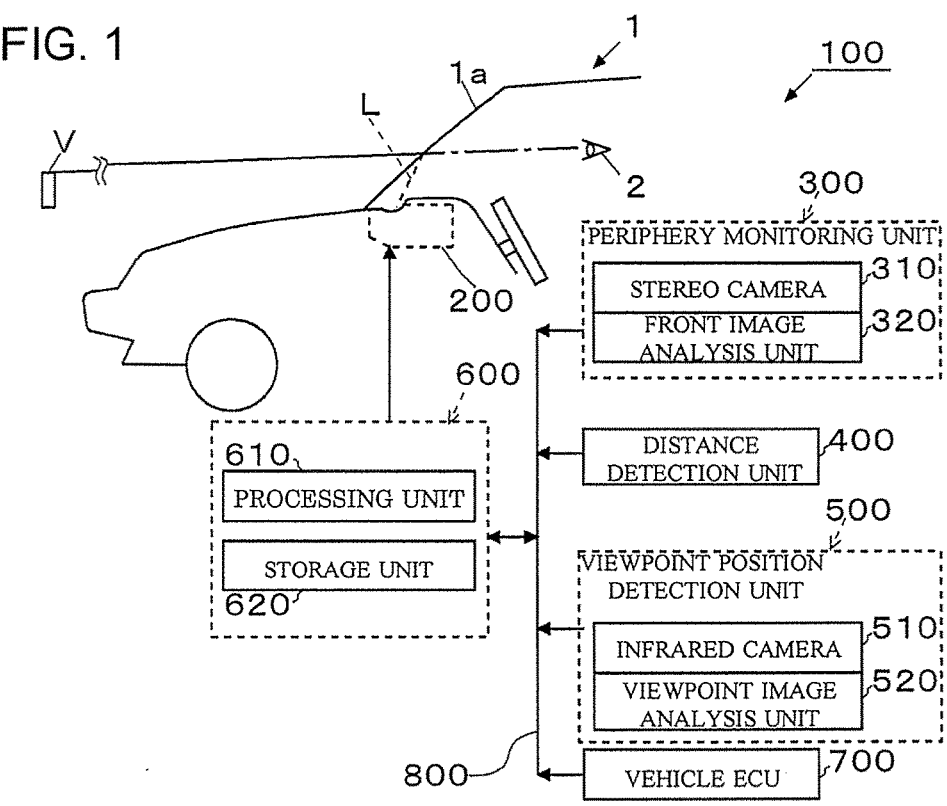
FIG. 1 is a diagram showing a configuration of a vehicle warning device in a first embodiment of the present invention.

An embodiment of a vehicle warning device 100 according to the present invention will be described with reference to FIG. 1.

The vehicle warning device 100 is mounted on an own vehicle 1. The vehicle warning device includes a display unit 200 that displays a warning for a user 2 of the own vehicle 1, a periphery monitoring unit 300 that captures an image ahead of the own vehicle 1, a distance detection unit 400 that detects a distance between the own vehicle 1 and a specific object W (e.g., preceding vehicle W), a viewpoint position detection unit 500 that detects a viewpoint position of the user 2, and a control unit 600 that enters information from the periphery monitoring unit 300, the distance detection unit 400, and the viewpoint position detection unit 500, and controls the display unit 200.

The display unit 200 is a headup display unit, which projects a display light L to a windshield 1a of the own vehicle 1, and enables the user 2 to recognize a superimposed image V as a virtual image along with an actual scene through the windshield 1a. The display unit adjusts a position of the display light L projected to the windshield 1a under the control of the control unit 600 described later, and enables a display of the superimposed image V over the specific object W on the actual scene ahead of the own vehicle 1. Further, the display unit 200 is connected to a vehicle ECU 700 or a not-shown navigation system and the like, and is able to display a vehicle information image such as a vehicle speed, in addition to the superimposed image V over the specific object W of an actual scene, and a route guidance image consisting of an arrow image for route guidance.

The periphery monitoring unit 300 monitors a condition ahead of the own vehicle 1. In this embodiment, the periphery monitoring unit includes a stereo camera 310 for capturing an image of the front of the own vehicle 1, and a front image analysis unit 320 for analyzing the image data captured by the stereo camera 310.

The stereo camera 310 captures an image of a front area including a road on which the own vehicle 1 travels. The front image analysis unit 320 analyzes the image data captured by the stereo camera 310 by a well-known image processing such as a pattern matching method. Thereby, the front image analysis unit analyzes information about a road shape (lane, white line, stop line, crosswalk, road width, number of lanes, intersection, curve, branch, and the like) and information about an object (specific object W) on a road (preceding vehicle and obstacles). Further, the front image analysis unit is able to calculate a distance between the captured specific object W (preceding vehicle, obstacles, and the like) and the own vehicle 1.

In other words, in this embodiment, the periphery monitoring unit 300 outputs the information to the control unit 600 described later. The information includes information about an object on a road (specific object W) analyzed from the image data captured by the stereo camera 310, and the information about the distance between the captured specific object W and the own vehicle 1.

The distance detection unit 400 is, for example, configured with a short-range detection radar such as a millimeter wave radar, a sonar using ultrasonic waves or the like, and an imaging camera such as a visible light camera and an infrared camera. The distance detection unit outputs the obtained data to the control unit 600 described later. Based on the data entered from the periphery monitoring unit 300, the control unit 600 is able to calculate a distance to the specific object W (vehicle distance) and a relative speed to the specific object W.

The viewpoint position detection unit 500 is configured to detect a viewpoint position of the user 2 (position in vertical and lateral directions of a sight line). In this embodiment, the viewpoint position detection unit includes an infrared camera 510 for capturing an image of the user 2, and a viewpoint image analysis unit 520 for analyzing the image data captured by the infrared camera 510.

The infrared camera 510 is configured to capture an image of eyes of the user 2. The viewpoint image analysis unit 520 analyzes the image data captured by the infrared camera 510 by a well-known image processing such as a pattern matching method. Thereby, the front image analysis unit analyzes a viewpoint position of the user 2, and outputs the information about the viewpoint position of the user 2 to the control unit 600 described later. Incidentally, the user 2 may operate a not-shown input means for adjusting the display position of the superimposed image V to match the user's own viewpoint position. In such a case, the viewpoint position detection unit 500 may be omitted.

The control unit 600 includes a processing unit 610 and a storage unit 620. The processing unit 610 includes one or more microprocessors, a microcontroller, an ASIC, an FPGA, any other ICs and the like. The storage unit 620 includes a rewritable RAM, a read-only ROM, an inerasable program, a read-only EEPROM, and one or more memories such as a flash memory as a nonvolatile memory capable of storing programs and data. The control unit 600 is connected to the periphery monitoring unit 300, the distance detection unit 400, the viewpoint position detection unit 500, the vehicle ECU 700, a not-shown navigation system (onboard equipment), and the like, through a bus 800 such as a CAN (Controller Area Network) bus communication or the like, so as to be able to transfer a signal.

The processing unit 610 calculates the display position of the superimposed image V to be displayed in the display unit 200, and controls the display unit 200 based on the information about the position of the specific object W entered from the periphery monitoring unit 300 and the information about the viewpoint position of the user 2 entered from the viewpoint position detection unit 500. By setting the display position of the specific object W based on the position of the specific object W and the position of the viewpoint position detection unit 500 as above, it is possible to display the superimposed image V at a desired position relative to the specific object W in an actual scene, even if the physique and posture of the user 2 are different.

States of the actual scene and the superimposed image V recognized by the user 2 will be described with reference to FIG. 2. FIG. 2 shows an example of a scene when the user 2 views the forward from a driver's seat of the own vehicle 1. Detecting the specific object W on or near a traveling course of the own vehicle 1 through the periphery monitoring unit 300, the processing unit 610 causes the display unit 200 to display a circular mark image V1 surrounding the specific object W visible to the user 2, and an auxiliary image V2 that is an expansible bar graph displayed above the mark image V1.

The mark image V1 has a plurality of arcuate index images V1a divided into a plurality of regions on a circular trajectory surrounding the specific object W, and a gap V1b formed between the plurality of index images V1a when the index image V1a contracts. Incidentally, in FIG. 2, the mark image V1 is shown so as to have eight arcuate index images V1a divided into eight regions on the circular trajectory surrounding the specific object W. The processing unit 610 expands and contracts each of the plurality of index images V1a based on a risk potential RP described later.

The auxiliary image V2 includes an expansible image V2a that linearly expands and contracts based on a risk potential RP described later, and a gauge image V2b that is displayed expanding from a minimum length to a maximum length of the expansible image V2a. The auxiliary image V2 informs the user 2 of a degree of a risk potential RP described later depending on how much the expansible image V2a expands to the gauge image V2b.

The processing unit 610 calculates the risk potential RP based on the distance between the specific object W and the own vehicle 1 (distance between the preceding vehicle W and the own vehicle 1) entered from the distance detection unit 400, the relative speed of the own vehicle 1 to the specific object W, and the vehicle speed of the own vehicle 1 entered from the vehicle ECU 700. These risk potential RP calculation program are stored in advance in the storage unit 620. The processing unit 610 calculates the risk potential RP by reading these calculation programs from the storage unit 620. In particular, the risk potential RP is calculated higher, for example, as the distance between the preceding vehicle W and the own vehicle 1 is shorter, the relative speed of the own vehicle 1 to the specific object W is faster, or the speed of the own vehicle 1 is faster.

As the risk potential RP increases, the processing unit 610 displays the index image V1a of the mark image V1 longer and the length of the gap V1b between the index images V1a shorter. In other words, as the risk potential RP increases, the processing unit 610 displays the line density of the mark image V1 disposed on the trajectory surrounding the specific object W (index image V1a/(index image V1a+gap V1b)) higher (shift from the state of FIG. 2 (a) to FIG. 2 (b)).

Further, as the risk potential RP decreases, the processing unit 610 displays the index image V1a of the mark image V1 shorter and the length of the gap V1b between the index images V1a longer. In other words, as the risk potential RP decreases, the processing unit 610 displays the line density of the mark image V1 disposed on the trajectory surrounding the specific object W lower (shift from the state of FIG. 2 (b) to FIG. 2 (a)). The expansible image V2a expands and contracts in accordance with the risk potential RP similar to the index image V1a.

As the above, since the mark image V1 denoting the position of the specific object W to be displayed in the vicinity of the specific object W contracts depending on the risk potential RP, it is possible to inform the user 2 of the position of the specific object W and the risk to the specific object W by a display with reduced eye movement. Further, when the risk potential RP is small, the index image V1a is short and the gap V1b between the index images V1a is long. This prevents a decrease in the visibility of the mark image V1 for the specific object W with low risk potential RP, and prevents the eye of the user 2 from turning to a display with low emergency, thereby contributing to safe driving. Further, by displaying the auxiliary image V2, which linearly expands and contracts on the gauge image V2b expanding from a minimum value to a maximum value, in the vicinity of the mark image V1, the user can easily recognize the degree of the risk potential RP relative to a maximum value. Further, by synchronizing the expansion and contraction of the index image V1a with those of the expansible image V2a, the user 2 can clearly recognize the relationship between the mark image V1 and the auxiliary image V2.

Furthermore, when the risk potential RP is greater than a predetermined threshold value, as shown in FIG. 2 (b), the processing unit 610 may display a warning image V3 in the frame-shaped mark image V1. With such a configuration, it is possible to warn the user 2 more strongly.

Figure 3:
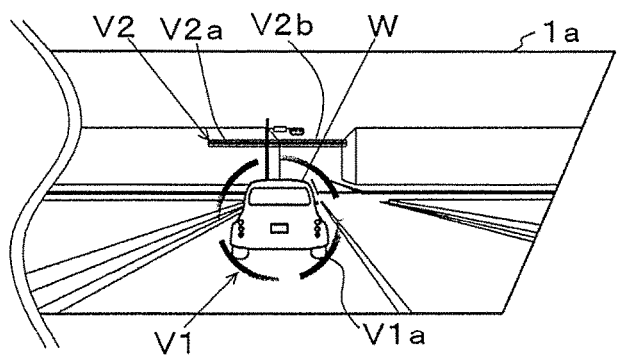
FIG. 3 shows an example of a mark image display in the above embodiment.

Further, when the risk potential RP is greater than a predetermined threshold value, the processing unit 610 may display a plurality of index images V1a in a manner to move on a predetermined trajectory. In this embodiment, as shown in FIG. 3, the index image V1a is shown turning over the trajectory surrounding the specific object W. With such a configuration, it is possible to warn the user 2 more strongly.

Figure 4:
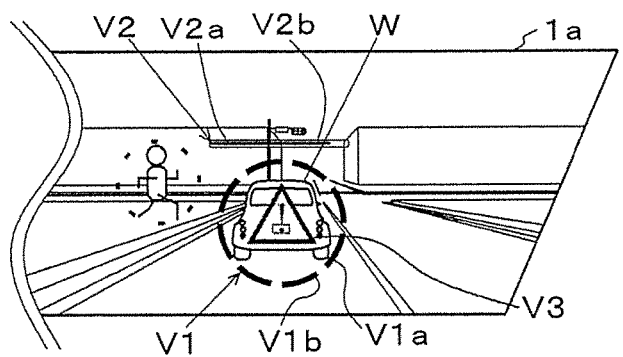
FIG. 4 shows an example of a mark image display in the above embodiment.

Still further, when there are two or more specific objects W having a risk potential RP, the processing unit 610, as shown in FIG. 4, displays the mark image V1 and the auxiliary image V2 for the specific object W with a high risk potential RP, and does not display the auxiliary image V2 for the specific object W with a low risk potential RP. As the above, by increasing the number of superimposed images V to be displayed in the vicinity of the specific object W with a high risk potential RP, it is possible to call the attention of the user 2 to the specific object W with a high risk. Further, by superimposing the mark image V1 with many gaps V1b and low visibility on the specific object W with a low risk potential RP, it is possible to enable the user 2 to recognize the position of the specific object W with a low risk potential RP without distracting attention.

The index image V1a of the mark image V1, indicating the position of the specific object W and the degree of the risk potential RP, is not restricted to the display mentioned above, but may be a display as described below. FIG. 5 shows modifications of the mark image V1. FIGS. 5 (a), (c) and (e) shows the mark image V1 when the risk potential RP is low. FIGS. 5 (b), (d) and (f) show the mark image V1 when the risk potential RP is high.

As for the mark image V1 in the modification, when the risk potential RP increases, as shown in FIGS. 5 (a) and (b), the visibility may be improved by decreasing the number of the gaps V1b by decreasing the number of divisions of the index image V1a. Further, when the risk potential RP increases, the visibility may be improved by increasing the number of divisions of the index image V1a and decreasing the number of gaps V1b.

Further, the mark image V1 is not restricted to a bar graph display, but may be a dot display, as shown in FIGS. 5 (c) and (d), in which the number of displayed dots is different depending on the degree of the risk potential RP. Even in such a configuration, it is possible to enable the user 2 to recognize the degree of the risk potential RP by increasing or decreasing the number of dots of the index image V1a (increasing or decreasing the gap V1b).

Furthermore, the mark image V1 need not be the index image V1a whose entire figure surrounding the specific object W varies depending on the risk potential RP. It is possible, as shown in FIGS. 5 (e) and (f), to dispose a siege image V1c, which surrounds a part of the specific object W and does not alter in accordance with the degree of the risk potential RP, in a part of the mark image V1. It is also possible to dispose the index image V1a (gap V1b), which alters in accordance with the degree of the risk potential RP, in a part of the mark image V1. As the above, by providing the siege image V1c, which does not alter in accordance with the risk potential RP, in a part of the mark image V1, it is possible to always indicate the position of the specific object W regardless of the degree of the risk potential RP. It is also possible to inform the user 2 of the degree of the risk potential RP by a display in which the user's eye movement is suppressed by the index image V1a.

Figure 6:
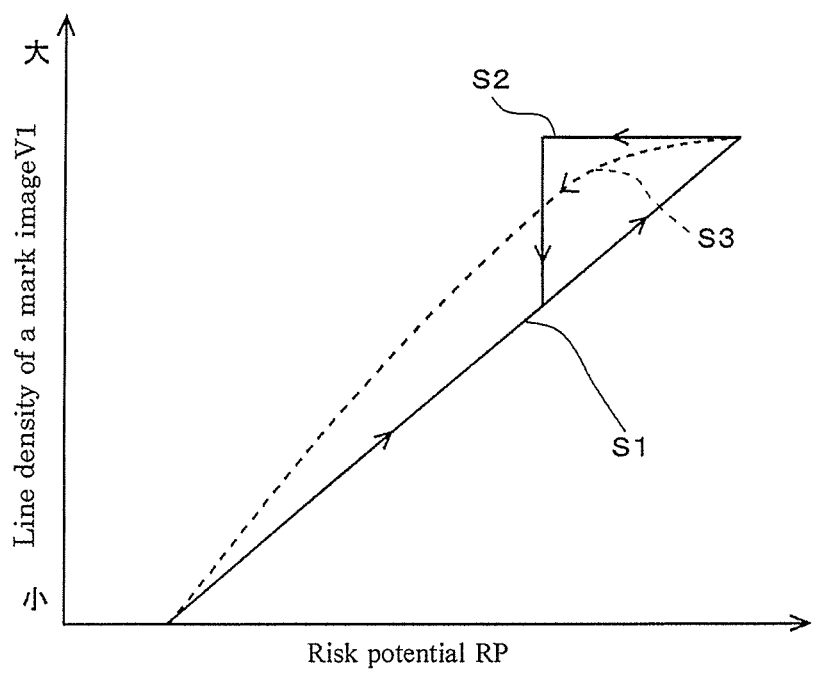
FIG. 6 is a graph showing the relationship between a risk potential and a line density of a mark image in the above embodiment.

Still further, the rate of change of a display range (length) of the index image V1a relative to the degree of the risk potential RP may be set different at the time of increase of the risk potential and at the time of decrease of the risk potential. In particular, when the risk potential RP increases, the display range of the index image V1a may increase along a line S1 shown in FIG. 6. When the risk potential RP decreases, the display range of the index image V1a may be maintained as shown by a line S2 in FIG. 6. Further, when the risk potential RP decreases, the rate of change may be gentle compared with when the risk potential RP increases (line S1) as shown by a line S3 in FIG. 6. As the above, since the rate of change of the display range of the index image V1a relative to the degree of the risk potential RP is set lower at the time of decrease of the risk potential RP than that at the time of increase of the risk potential RP, it is possible to continually call attention of the user 2 to the specific object W that the risk potential RP has increased once.

The mark image V1 is not restricted to a circle, but may be a polygon such as square, rectangle, hexagon and the like, or a closed graphic such as an ellipse, curve and the like. The mark image V1 may be a partially opened curve surrounding the specific object W and/or an open graphic having a bending point.

Determining that the user 2 does not recognize the forward by the information about the viewpoint position from the viewpoint position detection unit 500, the control unit 600 may alter the mark image V1 to have a higher risk than the mark image V1 corresponding to the risk potential RP at that time. Further, determining that the user 2 does not recognize the forward, the control unit 600 may display the mark image V1 to move on the trajectory regardless of the degree of the risk potential RP.

Further, in the above embodiment, the display unit 200 has been described as a headup display unit. The display unit 200 may be a display panel such as a not-shown liquid crystal panel disposed on the instrument panel of the own vehicle 1. In other words, the display unit 200 composed of the display panel enables the user to recognize the position of the specific object W and the risk potential RP with less eye movement, by displaying an actual scene captured by the periphery monitoring unit 300 or the like and the specific object W superimposed on the specific object W of the actual scene, thereby.

The present invention is not to be limited to the embodiments described hereinbefore. It is possible to add modifications (including deletion of the components) appropriately without departing from the spirit or essential characteristics of the invention.

INDUSTRIAL APPLICABILITY

The present invention is mounted on a moving body such as a vehicle, and is applicable to a virtual image display device such as a headup display to enable a user to recognize a virtual image.

DESCRIPTION OF REFERENCE NUMERALS

1 Own vehicle
1a Windshield
2 User
100 Vehicle warning device
200 Display unit
300 Periphery monitoring unit
310 Stereo camera
320 Front image analysis unit
400 Distance detection unit
500 Viewpoint position detection unit
510 Infrared camera
520 Viewpoint image analysis unit
600 Control unit
610 Processing unit
620 Storage unit
700 Vehicle ECU
800 Bus
L Display light
V Superimposed image
V1 Mark image
V1a Index image
V1b Gap
V2 Auxiliary image
V2a Expansible image
V2b Gauge image
W Specific object

The invention claimed is:

1. A vehicle warning device, comprising:
a periphery detector that detects a specific object in proximity to a vehicle;
a display;
one or more processors; and
a memory comprising programs stored therein, which, when executed by the one or more processors, cause the one or more processors to perform operations, the operations comprising:
displaying, on the display, a plurality of index images along an enclosed trajectory surrounding the specific object, wherein the plurality of index images includes a first index image and a second index image, the first index image and the second index image are contiguously or intermittently disposed on the enclosed trajectory;
calculating a risk potential relative to the specific object; and
adjusting a trajectory coverage ratio in accordance with the calculated risk potential relative to the specific object, the trajectory coverage ratio being a ratio of 1) the plurality of index images including the first index image and the second index image covering a path of the enclosed trajectory to 2) an entire path of the enclosed trajectory,
wherein when the risk potential relative to the specific object changes from a first risk potential to a second risk potential, the trajectory coverage ratio is adjusted from a first trajectory coverage ratio to a second trajectory coverage ratio, and
wherein when the first index image and the second index image are intermittently disposed on the enclosed trajectory so that 1) a first gap is disposed between a first end of the first index image and a first end of the second index image and 2) a second gap is disposed between a second end of the first index image and a second end of the second index image, the trajectory coverage ratio is adjusted by changing a length of the first index image extending along the enclosed trajectory and a length of the second index image extending along the enclosed trajectory while the first gap and the second gap on the gap remain on the enclosed trajectory.

2. The vehicle warning device according to claim 1, wherein
when the first index image and the second index image are contiguously disposed on the enclosed trajectory so that 1) the first gap is disposed between the first end of the first index image and the first end of the second index image and 2) the second end of the first index image shares a border with the second end of the second index image, the trajectory coverage ratio is adjusted by changing a length of the first index image extending along the enclosed trajectory while maintaining a length of the second index image extending along the enclosed trajectory.

3. The vehicle warning device according to claim 1, wherein a rate of adjusting the trajectory coverage ratio according to in the risk potential differs from a rate of adjusting the ratio according to decrease in the risk potential.

4. The vehicle warning device according to claim 1, wherein the operations further comprising:
displaying, on the display, an expansible image in proximity to the first index image and the second index image, the expansible image extends in a linear direction; and
adjusting a length of the expansible image along the linear direction in accordance with the risk potential.

5. The vehicle warning device according to claim 1, wherein the operations further comprising moving the first index image and the second index image along the trajectory when the risk potential reaches a predetermined value.

6. The vehicle warning device according to claim 1, further comprising a user viewpoint position detector that detects a viewpoint position of a user, wherein the operations further comprising adjusting a display position of the first index image and the second index image on the display to match the detected viewpoint position of the user.

7. A vehicle warning device, comprising:
- a periphery detector that detects a specific object in proximity to a vehicle;
- a display;
- one or more processors; and
- a memory comprising programs stored therein, which, when executed by the one or more processors, cause the one or more processors to perform operations, the operations comprising:
  - displaying, on the display, a plurality of index images along an enclosed trajectory surrounding the specific object, wherein the plurality of index images includes a first index image and a second index image, the first index image and the second index image are contiguously or intermittently disposed on the enclosed trajectory;
  - calculating a risk potential relative to the specific object; and
  - adjusting a trajectory coverage ratio in accordance with the calculated risk potential relative to the specific object, the trajectory coverage ratio being a ratio of 1) the plurality of index images covering a path of the enclosed trajectory to 2) an entire path of the enclosed trajectory,
  - wherein when the risk potential relative to the specific object changes from a first risk potential to a second risk potential, the trajectory coverage ratio is adjusted from a first trajectory coverage ratio to a second trajectory coverage ratio, and
  - wherein when the first index image and the second index image are intermittently disposed on the enclosed trajectory so that 1) a first gap is disposed between a first end of the first index image and a first end of the second index image and 2) a second gap is disposed between a second end of the first index image and a second end of the second index image, the trajectory coverage ratio is adjusted by increasing or decreasing a number of index images included in the plurality of index images displayed on the enclosed trajectory in accordance with the risk potential.

8. The vehicle warning device according to claim 7, wherein a rate of adjusting the trajectory coverage ratio according to in the risk potential differs from a rate of adjusting the ratio according to decrease in the risk potential.

9. The vehicle warning device according to claim 7, wherein
when the first index image and the second index image are contiguously disposed on the enclosed trajectory so that 1) the first gap is disposed between the first end of the first index image and the first end of the second index image and 2) the second end of the first index image shares a border with the second end of the second index image, the trajectory coverage ratio is adjusted by changing a length of the first index image extending along the enclosed trajectory while maintaining a length of the second index image extending along the enclosed trajectory.

10. The vehicle warning device according to claim 7, wherein the operations further comprising:
- displaying, on the display, an expansible image in proximity to the first index image and the second index image, the expansible image extends in a linear direction; and
- adjusting a length of the expansible image along the linear direction in accordance with the risk potential.

11. The vehicle warning device according to claim 7, wherein the operations further comprising moving the first index image and the second index image along the trajectory when the risk potential reaches a predetermined value.

12. The vehicle warning device according to claim 7, further comprising a user viewpoint position detector that detects a viewpoint position of a user, wherein the operations further comprising adjusting a display position of the first index image and the second index image on the display to match the detected viewpoint position of the user.

* * * * *